(12) United States Patent
Francis et al.

(10) Patent No.: US 6,390,498 B1
(45) Date of Patent: May 21, 2002

(54) CONFIGURATION FOR TRIGGERING RESTRAINING DEVICES IN A MOTOR VEHICLE

(75) Inventors: Kenneth Francis, Rochester Hills, MI (US); Alfons Haertl, Bad Abbach (DE)

(73) Assignee: Siemens Aktiengesellschaft, Munich (DE)

( * ) Notice: Subject to any disclaimer, the term of this patent is extended or adjusted under 35 U.S.C. 154(b) by 401 days.

(21) Appl. No.: 09/250,863

(22) Filed: Feb. 16, 1999

Related U.S. Application Data

(63) Continuation of application No. PCT/DE97/01722, filed on Aug. 13, 1997.

(30) Foreign Application Priority Data

Aug. 14, 1996 (DE) .......................................... 196 32 836

(51) Int. Cl.[7] .............................................. B60R 21/32
(52) U.S. Cl. ...................................... 280/735; 180/282
(58) Field of Search .......................... 280/735; 180/282; 340/429, 436

(56) References Cited

U.S. PATENT DOCUMENTS

| | | | | |
|---|---|---|---|---|
| 4,243,248 A | * | 1/1981 | Scholz et al. ................ | 280/735 |
| 5,233,213 A | * | 8/1993 | Marek .......................... | 257/415 |
| 5,408,411 A | | 4/1995 | Nakamura et al. | |
| 5,468,013 A | * | 11/1995 | Gille ............................ | 280/735 |
| 5,483,447 A | * | 1/1996 | Jeenicke et al. ............. | 280/735 |
| 5,513,109 A | * | 4/1996 | Fujishima .................... | 280/735 |
| 5,775,726 A | * | 7/1998 | Timothy et al. .......... | 280/730.1 |
| 5,809,439 A | * | 8/1998 | Damisch ...................... | 280/735 |
| 5,890,084 A | * | 3/1999 | Halasz et al. ................ | 280/735 |
| 5,892,435 A | * | 4/1999 | Buchheim et al. .......... | 340/438 |
| 5,900,807 A | * | 5/1999 | Moriyama et al. .......... | 340/436 |

FOREIGN PATENT DOCUMENTS

| | | |
|---|---|---|
| DE | 37 05 920 C2 | 12/1988 |
| DE | 40 41 049 A1 | 7/1992 |
| DE | 41 14 992 C1 | 8/1992 |
| DE | 44 36 162 C1 | 3/1996 |
| DE | 44 36 379 A1 | 4/1996 |
| EP | 0 430 813 A1 | 6/1991 |
| EP | 0 686 533 A1 | 12/1995 |
| JP | 48-31646 | 4/1973 |
| JP | 48-58533 | 8/1973 |
| JP | 4-7966 | 1/1992 |
| JP | 4-119760 | 10/1992 |
| JP | 06 001 199 A | 1/1994 |
| JP | 06 234 342 A | 8/1994 |
| JP | 08 091 169 A | 4/1996 |

OTHER PUBLICATIONS

International Publication No. WO 96/09193 (Kithl), dated Mar. 28, 1996.

\* cited by examiner

*Primary Examiner*—J. J. Swann
*Assistant Examiner*—James S. McClellan
(74) *Attorney, Agent, or Firm*—Herbert L. Lerner; Laurence A. Greenberg; Werner H. Stemer

(57) ABSTRACT

A configuration for triggering restraining devices in a motor vehicle. The configuration has a sensor device with two acceleration sensors with differently orientated sensitivity axes and with a rotational movement sensor for detecting rotational movements about the vertical axis of the vehicle. A triggering signal for at least one of the restraining devices is generated in a triggering circuit as a function of the acceleration signals and of the rotational movement signal.

10 Claims, 3 Drawing Sheets

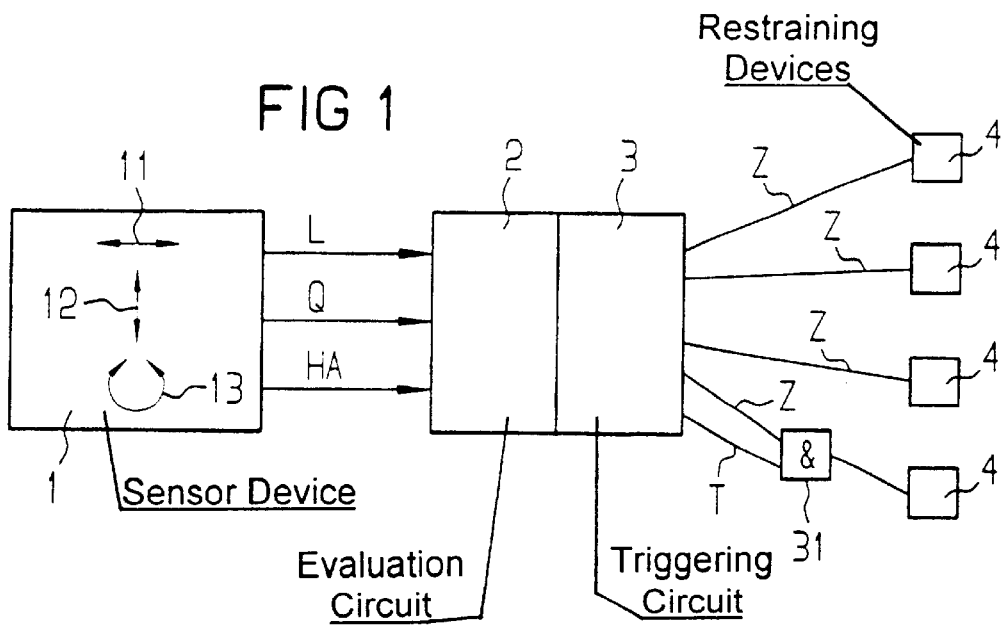
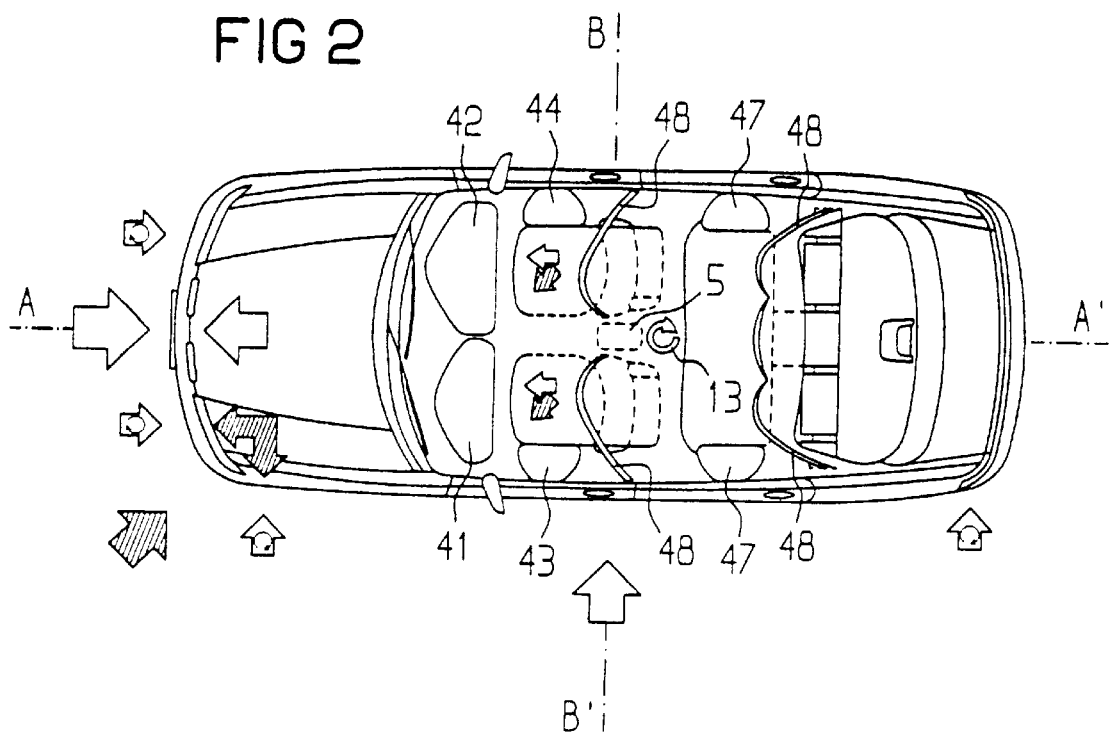

CONFIGURATION FOR TRIGGERING RESTRAINING DEVICES IN A MOTOR VEHICLE

CROSS-REFERENCE TO RELATED APPLICATION

This application is a continuation of copending International application NO. PCT/DE97/01722, filed Aug. 13, 1997, which designated the United States.

BACKGROUND OF THE INVENTION

FIELD OF THE INVENTION

The invention relates to an configuration for triggering restraining devices in a motor vehicle. The configuration has, a sensor device with a pair of linear acceleration sensors for triggering the restraining devices.

Such a configuration is known from Published, European Patent EP 0 686 533 A1. In that reference, a sensor device has two acceleration sensors whose sensitivity axes are disposed offset by +/−45° with respect to the longitudinal axis of the vehicle. The acceleration signals which are supplied by the acceleration sensors are evaluated in an evaluation circuit. As a function of the acceleration signals and of a seat-occupation detection device a triggering signal is generated for one or more selected restraining devices by a triggering circuit in accordance with the direction and strength of the impact.

In order to detect roll-overs in a motor vehicle, Published, Non-Prosecuted German Patent Application DE 44 36 379 A1 proposes an angle of inclination sensor which contains two acceleration sensors which are orientated differently with respect to one another and whose sensitivity axes are disposed in the plane of inclination.

German Patent DE 41 14 992 C1 discloses an angle of inclination sensor with a V-shaped hollow profile. Electrodes on the hollow profile walls serve to detect a change-in position of a mass element disposed in the hollow profile.

German Patent DE 37 05 920 C2 proposes an acceleration sensor for sensing accelerations in three spatial directions, which sensor has three coils which are offset with respect to one another by 90° and within which a magnet is cardanically mounted.

So-called local impacts, in which the vehicle suffers an impact which is offset with respect to the longitudinal axis or transversal axis of the vehicle, are the type of accident which occurs frequently in road traffic. Local impacts are typical of the collision of two vehicles at intersections, of accidents when a vehicle is overtaking or of accidents when a vehicle is moving back,into the flow of traffic after an overtaking procedure. In such accidents, the vehicle skids or rotates about its own vertical axis. It may be necessary to trigger selected restraining devices to provide the best possible protection to the vehicle occupants without, however, the linear acceleration sensors supplying acceleration signals which would lead to triggering.

SUMMARY OF THE INVENTION

It is accordingly an object of the invention to provide a configuration for triggering restraining devices in a motor vehicle that overcomes the above-mentioned disadvantages of the prior art devices of this general type, which protects a vehicle occupant as well as possible during any conceivable type of impact/accident.

With the foregoing and other objects in view there is provided, in-accordance with the invention, a configuration for triggering restraining devices, including: a sensor device having two acceleration sensors with differently orientated sensitivity axes and outputing acceleration signals, the sensor device also having a rotational movement sensor for detecting rotational movements about a vertical axis of a vehicle and outputing a rotational movement signal; an evaluation circuit for receiving and evaluating the acceleration signals and the rotational movement signal generated by the sensor device and outputing an evaluation signal; and a triggering circuit receiving the evaluation signal from the evaluation device for generating a triggering signal for a restraining device, the triggering signal generated in dependence on the acceleration signals and the rotational movement signal.

The sensor device of the configuration has the rotational movement sensor for detecting rotational movements about the vertical axis of the vehicle. In this way, skidding movements of the vehicle can be detected. A triggering signal for at least on restraining device is generated as a function of the acceleration signals of the linear acceleration sensors and the rotational movement signals supplied by the rotational movement sensor.

The configuration according to the invention provides the vehicle occupant/occupants with the best possible impact protection, both linear accelerations and rotational movements being detected by the sensor device and contributing to a triggering decision.

Preferably, the restraining devices to be triggered in the event of an impact are selected from the totality, or at least from a number, of restraining devices as a function of the acceleration signals and the rotational movement signal.

In accordance with an added feature of the invention, the sensor device has a further rotational movement sensor for detecting rotational movements about a longitudinal axis of the vehicle and outputs a further rotational movement signal, the triggering signal generated in dependence on the further rotational movement signal.

In accordance with an additional feature of the invention, the sensor device has an additional rotational movement sensor for detecting rotational movements about a transverse axis of the vehicle and outputs an additional rotational movement signal, and the triggering signal generated in dependence on the additional rotational movement signal.

In accordance with another feature of the invention, the restraining device is one of a plurality of restraining devices, at least one of the plurality of restraining devices has at least two stages that can be activated and have different protective effects for an occupant of the vehicle, and the triggering circuit selecting a suitable protection level of the plurality of restraining devices in dependence on the acceleration signals and the rotational movement signal.

In accordance with a further added feature of the invention, there is a common control unit mounted in a central region of the vehicle and housing the sensor device, the evaluation circuit, and the triggering circuit.

In accordance with a concomitant feature of the invention, the triggering circuit determines and generates a timing signal for a triggering time in dependence on the acceleration signals and the rotational movement signal, the restraining device is one of a plurality of restraining devices that are triggered only if the timing signal for the triggering time and the triggering signal are simultaneously present at a respective restraining device.

Other features which are considered as characteristic for the invention are set forth in the appended claims.

Although the invention is illustrated and described herein as embodied in a configuration for triggering restraining devices in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic block circuit diagram of a configuration according to the invention;

FIG. 2 is a plan view of a motor vehicle with various restraining devices and with directions of impact indicated;

DESCRIPTION OF THE PREFERRED EMBODIMENTS

Figure 4:
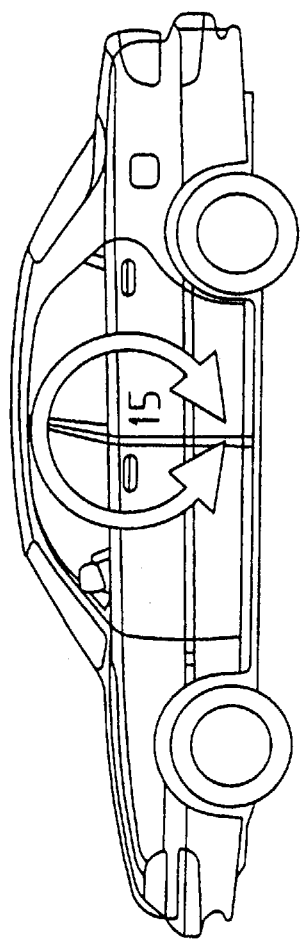
FIG. 4 is a side-elevational view of the motor vehicle with a pitching movement indicated.

In all the figures of the drawing, sub-features and integral parts that correspond to one another bear the same reference symbol in each case. Referring now to the figures of the drawing in detail and first, particularly, to FIG. 1 thereof, there is shown a block circuit diagram of a configuration of a sensor device 1 according to the invention having two linear acceleration sensors 11 and 12 and having a first rotational movement sensor 13. The linear acceleration sensors 11 and 12 are orientated orthogonally with respect to one another so that, for example, the longitudinal acceleration sensor 11 senses positive and negative accelerations in the direction of a longitudinal axis A–A' of vehicle in accordance with FIG. 2, while the transversal acceleration sensor 12 senses positive and negative accelerations in the direction of a transversal axis B–B' of the vehicle in accordance with FIG. 2. The first rotational movement sensor 13 senses positive and negative rotational movements about the vertical axis of the vehicle.

A longitudinal acceleration signal L, a transversal acceleration signal Q and a first rotational movement signal HA are supplied to an evaluation circuit 2 by the sensor device 1. The sensor signals L, Q, HA are evaluated in the evaluation circuit 2. Thus, speed signals are acquired, for example, from the acceleration signals L, Q by integration with respect to time, the signals are then compared with threshold values which are constant over time or variable over time. Triggering conditions for each restraining device 4 are stored in a triggering circuit 3 of the configuration. Such triggering specifications stipulate; for example, that a triggering signal Z is generated for a side airbag which is disposed on the front passenger's side, if the lateral acceleration exceeds a first high threshold value and at the same time the integrated longitudinal acceleration, the reduction in speed in the direction of the longitudinal axis of the vehicle remains below a further threshold value, or if a rotational acceleration about the vertical axis exceeds a third threshold value. The triggering signal Z for each restraining device 4 is therefore generated as a function of the acceleration signals L, Q and of the first rotational movement signal HA. The necessity to trigger the respective restraining device 4 is derived from these sensor signals L, Q, HA, for example by evaluating the sensor signals L, Q, HA in terms of the type of impact and the strength of the impact. Alternatively, a triggering signal is generated for at least one of the restraining devices 4, for example the side and front airbags, as a function of the acceleration signals, L, Q and of the first rotational movement signal HA, in which case, for example, the triggering signals for seatbelt pretensioning devices are generated exclusively as a function of the longitudinal acceleration signal L.

Preferably, a signal T for, an optimum triggering time of an associated restraining device 4 is determined for at least one of the restraining devices 4 by the triggering circuit 3 as a function of the acceleration signals L, Q and of the first rotational movement signal HA. The signal T for the optimum triggering time is fed, as is the triggering signal Z by which the actual triggering decision is made, to an AND gate 31 whose output is connected to a firing device of the associated restraining device(s) 4. In particular in the case of the triggering of front airbags during which there can be a relative long time period between the start of the impact and the triggering time which is optimum in terms of the protection of occupants, the triggering signal Z can be generated at a very early time at which, however, the optimum protective effect of the front airbag for the vehicle occupant has not yet been achieved. The associated restraining device 4 is always triggered at the optimum time as a result of the generation of the signal T for the optimum firing time at the optimum firing time and as a result of the fact that the firing is not enabled until the signal T for the optimum firing time and the triggering signal Z are present simultaneously.

Figure 5:
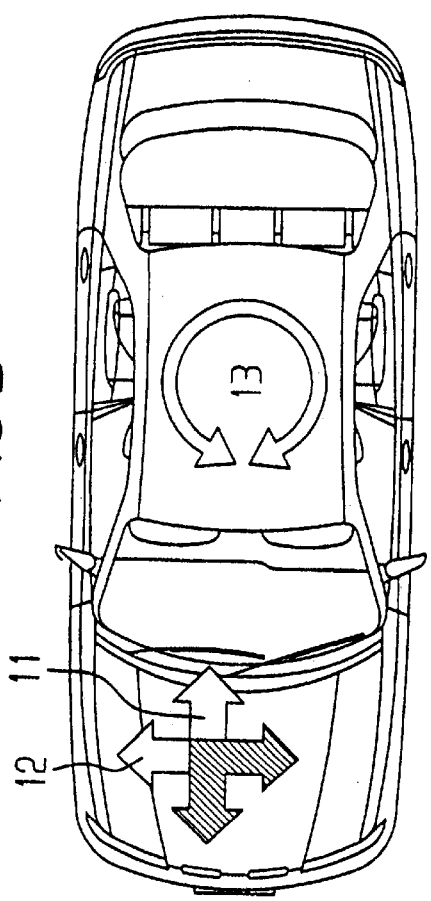
FIG. 5 is a plan view of the motor vehicle with a skidding movement indicated.

FIG. 5 shows, in a plan view of a motor vehicle, the preferable sensitivity directions which can be detected with the sensor device 1 with the longitudinal acceleration sensor 11, the transversal acceleration sensor 12 and the first rotational movement sensor 13 for detecting rotational movements about the vertical axis of the vehicle. The linear acceleration sensors 11 and 12 can, of course, can also be disposed with respect to one another at angles other than the preferable 90° angle. In all cases, an impact on the vehicle from the front, from the rear, from the sides and at an oblique angle should be detected with the sensors 11, 12. Thus, the sensitivity axes of the acceleration sensors 11, 12 must at least be orientated differently.

Linear acceleration sensors, such as the sensors 11 and 12, usually have a so-called cosine sensitivity characteristic. Therefore, the acceleration which is detected by the sensor is equal to the acceleration acting on the sensor multiplied by the cosine of the angle between the effective direction of the acceleration and the sensitivity axis of the acceleration sensor. The greater the angle between the acceleration which is occurring and the sensitivity axis of the sensor, the less effective the acceleration sensor becomes. In a configuration of the linear acceleration sensors 11 and 12 according to FIG. 5, only a weak acceleration sensor L or Q is supplied by the two sensors 11 and 12 in the case of an impact at an angle of, for example, 45° with respect to the longitudinal axis of the vehicle, so that the resolution of the signal leaves a lot to be desired particularly in terms of a triggering strategy with sensitive responses. Particularly here, the sensitivity of the triggering decision is improved by adding the rotational movement sensor 13, since, even in the case of most impacts which are directed towards the centerpoint of the vehicle, the vehicle absorbs the energy transmitted by the impact by a more or less pronounced rolling movement which is sensed by the rotational movement sensor 13. The rotational movement sensor 13 can therefore also contribute to the selection and triggering decision of the configuration in the case of impacts which are orientated toward the center of the vehicle.

Figure 3:
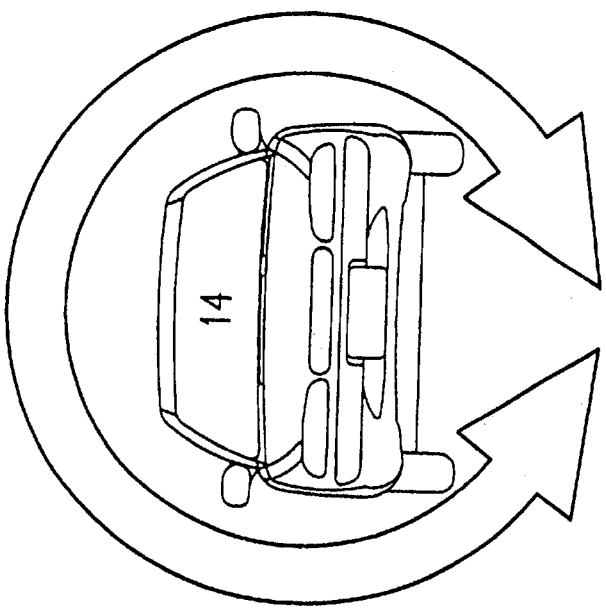
FIG. 3 is a front elevational view of the motor vehicle with a tilting movement indicated.

In order to be able to protect the vehicle occupants even in the event of an impact in which the impact energy is transmitted not just to the plane which is defined by the longitudinal axis A–A' of the vehicle and the transversal axis B–B' of the vehicle but also in which the vehicle tilts or pitches, a second rotational movement sensor 14 (FIG. 3) for detecting rotational movements about the longitudinal axis of the vehicle and/or a third rotational movement sensor 15 for detecting rotational movements about the transversal axis of the vehicle (FIG. 4) are disposed in the sensor device 1 in addition to the already mentioned sensors 11, 12 and 13. The second rotational movement sensor 14 preferably detects a rolling over of, the vehicle about its longitudinal axis, the third rotational movement sensor 15 detects a rolling over of the vehicle about its transversal axis or the initial stages of such a rolling over as when a vehicle rides under a lorry. The second and third rotational movement signals LA and QA which are supplied by the second and third rotational movement sensor 14 and 15 are, like the longitudinal and transversal acceleration signals L and Q, and the first rotational movement signal HA, processed in the evaluation and triggering circuit 2, 3.

The sensors 11 to 13, possibly also 14 and 15, are preferably disposed in a common housing. The invention also includes linear acceleration sensors, which are not structurally separated from one another but which have, for example, a common, seismic mass and a plurality of position sensors relating to the seismic mass, by which a linear acceleration is detected in a plane. The rotational movement sensors which are used can operate according to various, physical principles (optical, capacitive, inductive, . . . ), the physical principle on which the rotational movement sensor is based is not crucial to the invention. Preferably, the rotational movement sensor is also used by a control unit for controlling the driving stability and is preferably disposed in a control unit for controlling the driving stability. The other rotational movement sensors may, if appropriate, be used as a sensor for the movement dynamics, and can be used for controlling the stability of the driving movement. Preferably, the sensors which are used are of micromechanical construction and are disposed on a common substrate, the evaluation circuit 2 and, if appropriate, the triggering circuit 3 are additionally integrated on the same substrate. Such a control unit 5 (FIG. 2) is preferably disposed in a central region of the vehicle, for example on the vehicle tunnel. Here, if appropriate, the sensor device 1 can be disposed at a different point in the vehicle.

FIG. 2 shows the vehicle in a plan view with various restraining devices which can be triggered selectively, individually, together and/or with staggered timing by the configuration according to the invention. The configuration according to FIG. 2 has a front airbag for a driver 41, a front airbag for a front seat passenger 42, a side airbag for the driver 43 aside airbag for the front seat passenger 44, a head airbag for the driver 45 (FIG. 6), a head airbag for the front seat passenger 46 (FIG. 6), side airbags for rear passengers 47 and various seatbelt pretensioning devices 48. The arrows in FIG. 2 which in turn have an annular arrow inside them designate impact sites which cause a rotational movement of the vehicle about its vertical axis. The arrows outside the vehicle without an annular arrow designate a front impact or a side impact.

Figure 6:
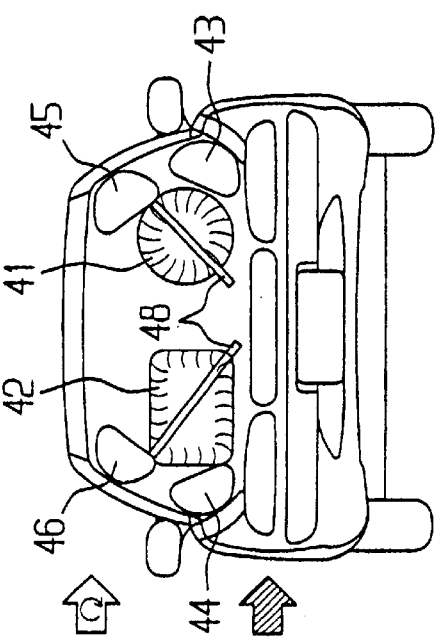
FIG. 6 is a front-elevation view of the motor vehicle with the various restraining devices and with directions of impact indicated.

FIG. 6 shows the front view of the motor vehicle. The arrow with the annular arrow in its center indicates an impact which causes the vehicle to tilt about its longitudinal axis.

We claim:

1. A configuration for triggering restraining devices, comprising:

a sensor device having two acceleration sensors with differently orientated sensitivity axes and outputing acceleration signals, said sensor device also having a rotational movement sensor for detecting rotational movements about a vertical axis of a vehicle and outputing a rotational movement signal;

an evaluation circuit for receiving and evaluating said acceleration signals and said rotational movement signal generated by said sensor device and outputing an evaluation signal; and a triggering circuit receiving said evaluation signal from said evaluation circuit for generating a triggering signal for a restraining device, said triggering signal generated in dependence on said acceleration signals and said rotational movement signal.

2. The configuration according to claim 1, wherein said sensor device has a further rotational movement sensor for detecting rotational movements about a longitudinal axis of the vehicle and outputs a further rotational movement signal, said triggering signal generated in dependence on said further rotational movement signal.

3. The configuration according to claim 1, wherein said sensor device has an additional rotational movement sensor for detecting rotational movements about a transverse axis of the vehicle and outputs an additional rotational movement signal, and said triggering signal generated in dependence on said additional rotational movement signal.

4. The configuration according to claim 1, wherein said restraining device is one of a plurality of restraining devices, and said triggering circuit selecting which of said plurality of restraining devices that are to be triggered in an event of an impact to the vehicle in dependence on said acceleration signals and said rotational movement signal.

5. The configuration according to claim 1, wherein said restraining device is one of a plurality of restraining devices, at least one of said plurality of restraining devices has at least two stages that can be activated and have different protective effects for an occupant of the vehicle, and said triggering circuit selecting a suitable protection level of said plurality of restraining devices in dependence on said acceleration signals and said rotational movement signal.

6. The configuration according to claim 5, including a common control unit mounted in a central region of the vehicle and housing said sensor device, said evaluation circuit, and said triggering circuit.

7. The configuration according to claim 1, wherein said restraining device has front airbags and side airbags.

8. The configuration according to claim 2, wherein said restraining device has a roll-over protection device.

9. The configuration according to claim 1, wherein said restraining device is one of a plurality of restraining devices, and said triggering signal is generated for any one of the plurality of restraining devices in dependendce on said acceleration signals and said rotational movement signal.

10. The configuration according to claim 1, wherein said triggering circuit determines and generates a timing signal for a triggering time in dependence on said acceleration signals and said rotational movement signal, said restraining device is one of a plurality of restraining devices that are triggered only if said timing signal for the triggering time and said triggering signal are simultaneously present at a respective restraining device.

* * * * *